UNITED STATES PATENT OFFICE.

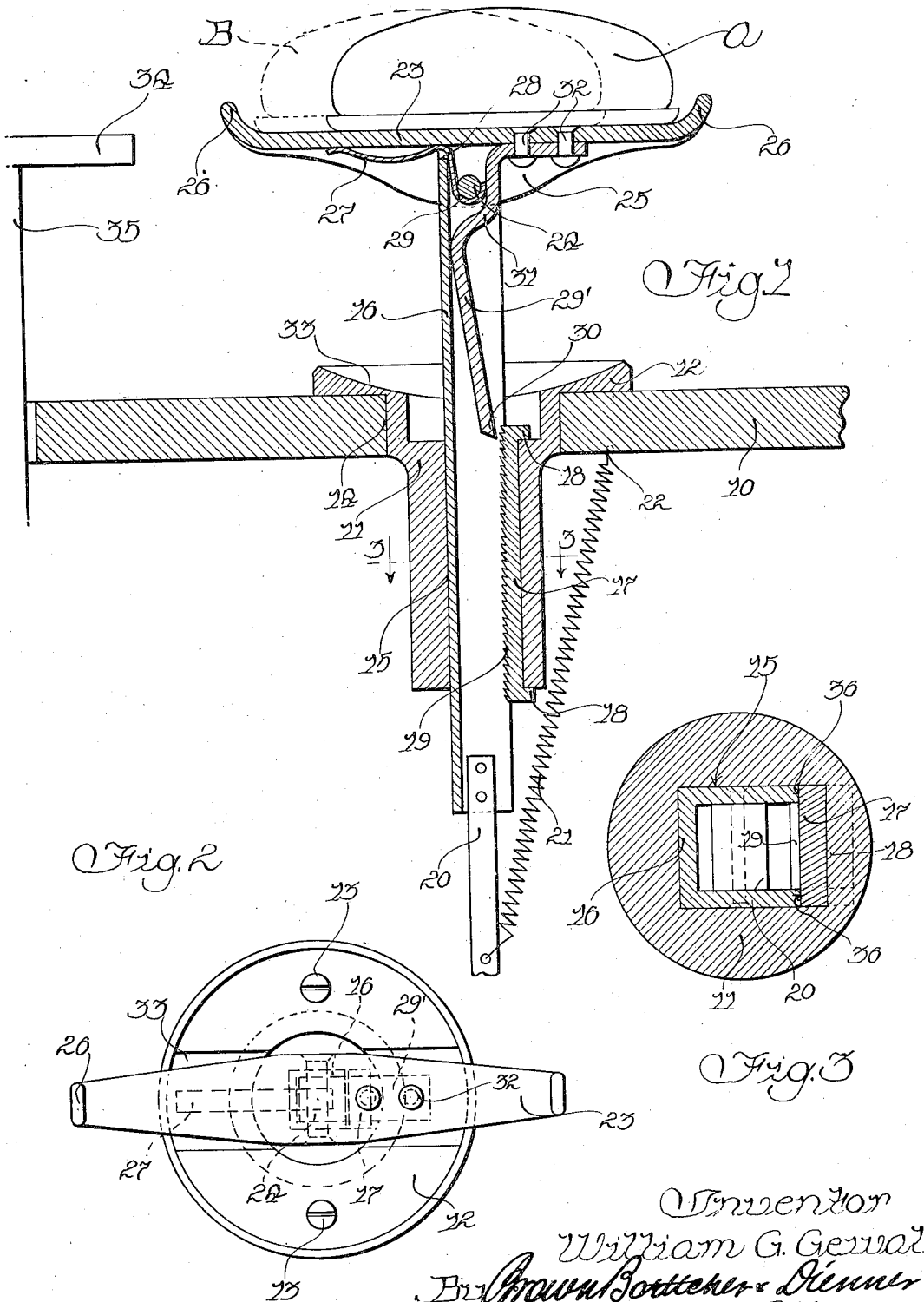

WILLIAM C. GEWALT, OF RACINE, WISCONSIN.

ACCELERATOR-PEDAL.

1,399,054.  Specification of Letters Patent.  Patented Dec. 6, 1921.

Application filed November 11, 1920. Serial No. 423,251.

*To all whom it may concern:*

Be it known that I, WILLIAM C. GEWALT, a citizen of the United States, residing at Racine, in the county of Racine and State of Wisconsin, have invented a certain new and useful Improvement in Accelerator-Pedals, of which the following is a full, clear, concise, and exact description, reference being had to the accompanying drawings, forming a part of this specification.

This invention relates to pedals and the like motion imparting devices, and more particularly to an improved pedal for use on motor vehicles, for controlling the throttle by the foot, and commonly known as the "accelerator."

Those who are familiar with automobile driving, especially when touring, are aware of the tediousness of keeping the foot down on the accelerator for any considerable length of time without relief for holding the desired speed; and also the difficulty of maintaining the accelerator at a desired setting when traveling over rough spots in the road, due to the pitching of the car. Usually this tends to make the driver involuntarily accelerate and decelerate, causing uneven and uncomfortable riding. These undesirable features are present in nearly all of the accelerator "buttons" or pedals now installed on the modern touring car or truck.

The primary aim of my invention is to provide a device of this character which does not tire the driver when he is required to maintain his foot on the accelerator for a considerable time, and which will effectively lock the device and prevent the involuntary change of speed pointed out hereinbefore.

Briefly, the device comprises a head or pedal portion, a stem and a guide, locking means being associated with the head and operable by a movement of the foot of the driver for limiting the depression of the pedal to that desired, so that further involuntary depression of the "accelerator" is rendered practically impossible.

A more concrete understanding of my invention will appear from the following detailed description taken in connection with the accompanying drawing, in which:

Figure 1 is a vertical sectional view of the device of my invention showing the same installed for operation;

Fig. 2 is a top plan of the same; and

Fig. 3 is a transverse section taken on the line 3—3 of Fig. 1 looking in the direction of the arrows.

Referring now more particularly to the drawing, 10 designates the floor-board of the vehicle, in which the accelerator is to be installed. The device consists of a guide 11, provided with an annular flange 12, which may be secured to the floor-board by screws 13 or the like. The shank of the guide extends through a suitable opening 14 formed in the floor-board. The guide 11 is formed with a longitudinal opening 15, preferably rectangular in shape for reception of the stem 16 of the device, said stem preferably consisting of a channel iron adapted to snugly fit the opening 15. A plate 17 is supported in the opening 15 along one wall thereof, the ends of the plate being flanged over as at 18—18 to retain the plate in position, the inner face of the plate having a plurality of inclined teeth 19 forming a rack, the teeth 19 facing upwardly.

The lower end of the stem 16 carries a bar 20 which is connected in any desired manner to the throttle of the motor vehicle, a coil spring 21 being connected to the bar 20 and to the floor-board 10 as at 22, for retaining the stem in the elevated position.

A head or pedal portion 23 is pivoted on the upper end of the stem 16 by means of a pin or bolt 24, the head having flanges or lugs 25 formed along the margin thereof and bent to embrace the top of the stem and receive the pin 24. The extreme ends of the head 23 are turned up to form lips 26—26 to prevent the driver's foot from accidentally becoming displaced from the head when driving.

The head 23 is maintained in horizontal or normal position, as shown in Fig. 1 by a flat spring 27 located under the head and bent downwardly as at 28 to engage at 29 under the pin 24.

The head 23 carries a tongue 29' having a pawl or sharpened extremity 30 for engagement with the teeth 19, as will be explained presently, the tongue 29' having an offset portion 31 therein to avoid the rivet 24, and being riveted or otherwise secured at 32 to the under face of the head 23. The offset portion 31 forms a stop and engages the inner face of the stem 16 for limiting the movement of the head 23 in one direction about the pivot 24. While the tongue 29' has been shown as a separate part of the head 23, it will be quite obvious that if desired this tongue may be struck from the head without materially reducing the strength or rigidity of the head.

The flange 12 is provided with a diametrical slot 33 to accommodate the lugs or flanges 25 formed on the head 23 when the same is depressed to the fullest extent.

In the arrangement as shown in the drawings, the brake pedal is indicated at 34 and is carried by the shank 35, in the usual manner. The view in Fig. 1 is made looking from the rear of the vehicle toward the front, so that the brake pedal will in reality be on the left side of the accelerator when the latter is installed.

For ordinary driving or when accelerating, the driver's foot is shown in the position A, and it will be seen that in this position the stem 16 may be depressed to any desired position for accelerating. When the desired speed has been reached, the driver moves his foot from the position A, shown in full line, to the position B, shown in dotted line. This is done by merely sliding the foot across the head 23. The foot in this position rocks the head 23 on the pin or rivet 24 against the tension of the spring 27, and thereby brings the end 30 of the tongue 29 into engagement with one of the teeth 19, automatically checking further depression of the accelerator stem 16, and maintaining the speed constant. Should rough spots be encountered in the road, any involuntary depression of the foot while in the position B cannot impart motion to the throttle, as the stem 16 is locked by the tongue 29'. When it is desired to stop the vehicle, the driver merely lifts his foot off the accelerator and applies it to the brake in the usual manner, the spring 21 returning the accelerator to the elevated or shut-off position. From an observation of Fig. 3, it will be seen that the free margins of the sides of the channel bar 16 engage with the exposed portions 36 of the plate 17, the plate 17 thus held in place in said opening 15.

While I have shown and described my invention as embodying certain specific parts, it will be understood that I have reserved the right to modify the structure disclosed without departing from the spirit and scope of the claims.

I claim:

1. A motion imparting device comprising a stem and a head, a guide for the stem, and means carried on and operable by the head for engagement with the guide for locking the stem.

2. A motion imparting device comprising a stem and a head, a guide for the stem, means carried on and operable by the head for engagement with the guide for locking the stem and means for manually maintaining said locking means out of engagement with the guide.

3. A motion imparting device comprising a stem and a head, a guide for the stem, means normally maintaining said stem elevated, said stem adapted to be manually depressed, and means operable by tilting of said head for engaging said guide and checking depression of said stem, said means being normally inactive and being rendered active only by tilting said head.

4. In combination, a guide, a stem mounted therein, means normally maintaining said stem elevated, a head on said stem, a rack in said guide, and means on the head for engagement with said rack.

5. In combination, a guide, a stem mounted therein, means normally maintaining said stem elevated, a head for depressing said stem and pivoted thereon, a rack in said guide means carried by the head for engaging said rack and checking depression of said stem, and means on the head for normally rendering said rack engaging means inoperative.

6. In combination, a stem, a guide for said stem, teeth on the guide, a head on the stem, and a pawl operable from the head for engagement with the teeth on said guide.

7. In combination, a stem, a guide for said stem, teeth on the guide, a head on the stem, a pawl operable from the head for engagement with the teeth on said guide, and means for normally maintaining said pawl out of engagement with the teeth.

8. In a motion imparting device a stem having a pedal portion on one end thereof, a normally inactive positive lock for the stem, vertical pressure on said head serving to depress the stem, and diagonal pressure serving to actuate the lock to check depression of said stem.

9. In combination, a stem, a guide, a head mounted on the stem and adapted to be tilted sidewise, and a positive locking device for locking the stem in the guide, said locking device being normally inactive so that the stem may be depressed freely to any desired position and may be locked at such position by sidewise tilting of the head.

In witness whereof, I hereunto subscribe my name this 8th day of November, 1920.

WILLIAM C. GEWALT.